United States Patent
Kanda et al.

(10) Patent No.: US 6,349,697 B1
(45) Date of Patent: Feb. 26, 2002

(54) DIRECT-FUEL-INJECTION-TYPE SPARK-IGNITION INTERNAL COMBUSTION ENGINE AND METHOD OF CONTROLLING THE INTERNAL COMBUSTION ENGINE

(75) Inventors: Mutsumi Kanda, Susono; Chiemi Sasaki, Gotenba, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 8 days.

(21) Appl. No.: 09/617,271

(22) Filed: Jul. 17, 2000

(30) Foreign Application Priority Data

Aug. 5, 1999 (JP) ............................................. 11-222815

(51) Int. Cl.[7] ............................. F02B 23/10; F01P 7/14
(52) U.S. Cl. .................. 123/295; 123/41.02; 123/41.72
(58) Field of Search .......................... 123/41.02, 41.72, 123/295, 298, 305

(56) References Cited

U.S. PATENT DOCUMENTS 5,970,949 A * 10/1999 Iwade et al. ................. 123/295

FOREIGN PATENT DOCUMENTS

JP  10-299539  11/1998
JP  11-62680   3/1999

* cited by examiner

Primary Examiner—Tony M. Argenbright
(74) Attorney, Agent, or Firm—Oliff & Berridge PLC

(57) ABSTRACT

A direct-fuel-injection-type spark-ignition internal combustion engine has a fuel injection valve which directly injects fuel into a cylinder. A nozzle hole of the fuel injection valve directs fuel toward an impingement portion of the cylinder bore located opposed to the nozzle hole in a lower section of the cylinder bore so that fuel can be injected into a cavity formed in a top face of a piston from an upper section of the cylinder bore during the latter half of a compression stroke. A cooler located at least in the neighborhood of the impingement portion in the lower section of the cylinder bore has a lower cooling capacity than a cooler located in the neighborhood of the upper section of the cylinder bore. Thus, fuel injected during the latter half of an intake stroke that adheres to the cylinder bore can be effectively gasified.

21 Claims, 10 Drawing Sheets

DIRECT-FUEL-INJECTION-TYPE SPARK-IGNITION INTERNAL COMBUSTION ENGINE AND METHOD OF CONTROLLING THE INTERNAL COMBUSTION ENGINE

INCORPORATION BY REFERENCE

The disclosure of Japanese Patent Application No. HEI 11-222815 filed on Aug. 5, 1999 including the specification, drawings and abstract is incorporated herein by reference in its entirety.

BACKGROUND OF THE INVENTION

1. Field of the Invention

The invention relates to direct-fuel-injection-type spark-ignition internal combustion engines and to methods of controlling the internal combustion engine. More particularly, the invention relates to direct-fuel-injection-type spark-ignition internal combustion engines which effectively gasify fuel that has adhered to a cylinder bore and to methods of controlling the internal combustion engine.

2. Description of Related Art

A direct-fuel-injection-type spark-ignition internal combustion engine has a fuel injection valve which directly injects fuel into a cylinder. In this engine, fuel injected into a cylinder in the latter half of a compression stroke is gasified, and a combustible mixture with good ignitability is formed only in the neighborhood of an ignition plug at the time of ignition. Thereby stratified charge combustion wherein a lean mixture can burn is realized in the cylinder as a whole.

In stratified charge combustion, fuel injected into the cylinder in the latter half of a compression stroke has to be gasified at the time of ignition. For this purpose, a certain period needs to be ensured from the end of fuel injection to ignition. Thus, it is impossible to inject a large amount of fuel in the latter half of a compression stroke. At the time of high rotational speed and high load when at least a large amount of fuel is required, stratified charge combustion is prohibited, and a large amount of fuel is injected in an intake stroke to realize homogeneous combustion wherein a homogeneous mixture is formed in the cylinder at the time of ignition (see Japanese Patent Application Laid-Open No. HEI 10-299539).

In such a direct-fuel-injection-type spark-ignition internal combustion engine, the fuel injection valve is disposed at a periphery of an upper section of a cylinder so as not to interfere with intake and exhaust ports or an ignition plug located in the upper section of the cylinder. In general, for the purpose of forming a combustible mixture in the neighborhood of the ignition plug during stratified charge combustion, fuel injected from the fuel injection valve is deflected towards an area in the neighborhood of the ignition plug by means of a cavity formed in a top face of a piston. Thus, fuel is injected diagonally downward from the fuel injection valve so that fuel injected in the latter half of a compression stroke travels into the cavity at a piston position at the time of the injection.

If a relatively large amount of fuel is injected from such a fuel injection valve in an intake stroke during homogeneous combustion, fuel injection is inevitably carried out also in the latter half of the intake stroke. The fuel injected at this moment collides with the cylinder bore instead of the top face of the piston. Part of the fuel that has collided with the cylinder bore adheres to the cylinder bore. Because the entire cylinder bore has been cooled by coolant, this adherent fuel remains where it is without being sufficiently gasified, and thus does not contribute to combustion.

Thus, during homogeneous combustion, a more than necessary amount of fuel needs to be injected to compensate for the fuel that is not gasified. For this reason, there is caused a problem of deterioration of fuel consumption rate or a problem of dilution of engine oil by the adherent fuel.

SUMMARY OF THE INVENTION

Thus, in a direct-fuel-injection-type spark-ignition internal combustion engine which has a fuel injection valve directly injecting fuel into a cylinder and which switches its combustion mode in accordance with an operating state of the engine between stratified charge combustion caused by fuel injection in the latter half of a compression stroke and homogeneous combustion caused by fuel injection in an intake stroke, even if fuel injected in the latter half of an intake stroke collides with a cylinder bore and is adhered thereto, the invention aims to effectively gasify this adherent fuel.

In order to address the aforementioned problems, a first aspect of the invention provides a direct-fuel-injection-type spark-ignition internal combustion engine comprising a fuel injection valve which has a nozzle hole directed towards a portion opposed to the nozzle hole in a lower section of the cylinder bore so that fuel can be injected from an upper section of the cylinder into a cavity formed in a top face of a piston, and a cooler which cools the cylinder bore. The cooler cools the cylinder bore so as to suppress a fall in temperature of at least one area of the cylinder bore adjacent to the impingement portion in comparison with a fall in temperature of the other area of the cylinder bore than at least one area adjacent to the impingement portion.

The cooler may have a first cooling portion and a second cooling portion. The first cooling portion cools an area close to the upper section of the cylinder bore. The second cooling portion cools at least an area close to the portion opposed to the nozzle hole in the lower section of the cylinder bore. The second cooling portion has a lower cooling capacity than the first cooling portion.

The cooler includes a coolant passage, and the coolant passage in an area close to the portion opposed to the nozzle hole is smaller in cross-section than the coolant passage in an area close to the upper section of the cylinder bore. Because of this construction, the cooler located at least in the area close to the portion opposed to the nozzle hole in the lower section of the cylinder bore has a lower cooling capacity than the cooler located in the area close to the upper section of the cylinder bore. Therefore, the occurrence of overheating is prevented by sufficiently cooling the upper section of the cylinder bore. Even if fuel injected in the latter half of an intake stroke during homogeneous combustion collides with the portion opposed to the nozzle hole in the cylinder bore and adheres thereto, the adherent fuel can be effectively gasified.

While the cooler is provided in an area close to the upper section of the cylinder bore, there may be no such cooler provided at least in an area close to the portion opposed to the nozzle hole in the lower section of the cylinder bore. Therefore, the occurrence of overheating is prevented by sufficiently cooling the upper section of the cylinder bore. Even if fuel injected in the latter half of an intake stroke during homogeneous combustion collides with the portion opposed to the nozzle hole in the cylinder bore and adheres thereto, this adherent fuel can be effectively gasified.

The cooler may include the coolant passage having a first passage extending at least in an area close to the portion opposed to the nozzle hole in the lower section of the cylinder bore and a second passage extending at least in an area close to the upper section of the cylinder bore. A control valve is disposed in the first passage. The first passage is independent of the second passage. During the homogeneous combustion, an opening degree of the control valve is reduced in comparison with an opening degree of the control valve during the stratified charge combustion, whereby an amount of coolant flowing through the first passage is reduced. Therefore, the occurrence of overheating is prevented by sufficiently cooling the upper section of the cylinder bore. Even if fuel injected in the latter half of an intake stroke during homogeneous combustion collides with the portion opposed to the nozzle hole in the cylinder bore and adheres thereto, this adherent fuel can be effectively gasified.

The cooler includes a coolant flow passage having a first passage extending in an area close to a side opposed to a nozzle hole of the fuel injection valve in the cylinder bore and a second passage extending in an area close to a side opposite the side opposed to the fuel injection valve in the cylinder bore. A control valve is disposed in the first passage. The first passage is independent of the second passage. During the homogeneous combustion, an opening degree of the control valve is reduced in comparison with an opening degree of the control valve during the stratified charge combustion, whereby an amount of coolant flowing through the first passage is reduced. Thus, the upper section of the cylinder bore on the side opposed to the nozzle hole of the fuel injection valve is not sufficiently cooled. However, this does not mean that the upper section of the cylinder bore is always insufficiently cooled. That is, the upper section of the cylinder bore is sufficiently cooled during stratified charge combustion. Therefore, the occurrence of overheating is prevented. Even if fuel injected in the latter half of an intake stroke collides with the portion opposed to the nozzle hole in the cylinder bore and adheres thereto, this adherent fuel can be effectively gasified.

The cooler may include a coolant passage having a first passage extending in an area close to a side opposed to a nozzle hole of the fuel injection valve in at least two of the cylinder bores and a second passage extending in an area close to a side opposite the side opposed to the nozzle hole of the fuel injection valve in the at least two cylinder bores. A coolant inlet portion is provided at one end of the second passage. A coolant outlet portion is provided at one end of the first passage. The other end of the first passage communicates with the other end of the second passage. There is provided a communication passage which extends between the two cylinder bores and through which the first passage communicates with the second passage. A control valve is provided in the communication passage. During the homogeneous combustion, an opening degree of the control valve is reduced in comparison with an opening degree of the control valve during the stratified charge combustion, whereby an amount of coolant flowing through the communication passage is reduced. Thus, high-temperature coolant, which has flowed through the second passage during homogeneous combustion and cooled the cylinder bores on a side opposite the side opposed to the nozzle hole of the fuel injection valve, flows through the first passage. Hence, the cylinder bores on the side opposed to the fuel injection valve are not sufficiently cooled. Even if fuel injected in the latter half of an intake stroke collides with the cylinder bores on the side opposed to the nozzle hole of the fuel injection valve and adheres thereto, this adherent fuel can be effectively gasified. During stratified charge combustion, coolant flows through the communication passages, whereby low-temperature coolant is supplied to the first passage. As a result, the cylinder bores on the side opposed to the fuel injection valve are sufficiently cooled. This means that the cylinder bores on this side are not always insufficiently cooled. Thus, the occurrence of overheating is prevented.

Furthermore, according to a method of controlling a direct-fuel-injection-type spark-ignition internal combustion engine of another aspect of the invention, a cylinder bore is cooled, and a fall in temperature at least in an area close to the portion opposed to the nozzle hole in the lower section of the cylinder bore is suppressed in comparison with a fall in temperature in an area close to the upper section of the cylinder bore.

Also, according to a method of controlling a direct-fuel-injection-type spark-ignition internal combustion engine of another aspect of the invention, a cylinder bore is cooled, and a fall in temperature in an area close to a side opposite a side opposed to the nozzle hole of the fuel injection valve in the cylinder bore is suppressed in comparison with a fall in temperature in an area close to the side opposed to the nozzle hole of the fuel injection valve in the cylinder bore.

According to the aforementioned control methods, the occurrence of overheating is prevented by sufficiently cooling the upper section of the cylinder bore. Even if fuel injected in the latter half of an intake stroke during homogeneous combustion collides with the portion opposed to the nozzle hole in the cylinder bore and adheres thereto, the adherent fuel can be effectively gasified.

BRIEF DESCRIPTION OF THE DRAWINGS

The foregoing and further objects, features and advantages of the invention will become apparent from the following description of preferred embodiments with reference to the accompanying drawings, wherein.

DESCRIPTION OF PREFERRED EMBODIMENTS

Figure 1:
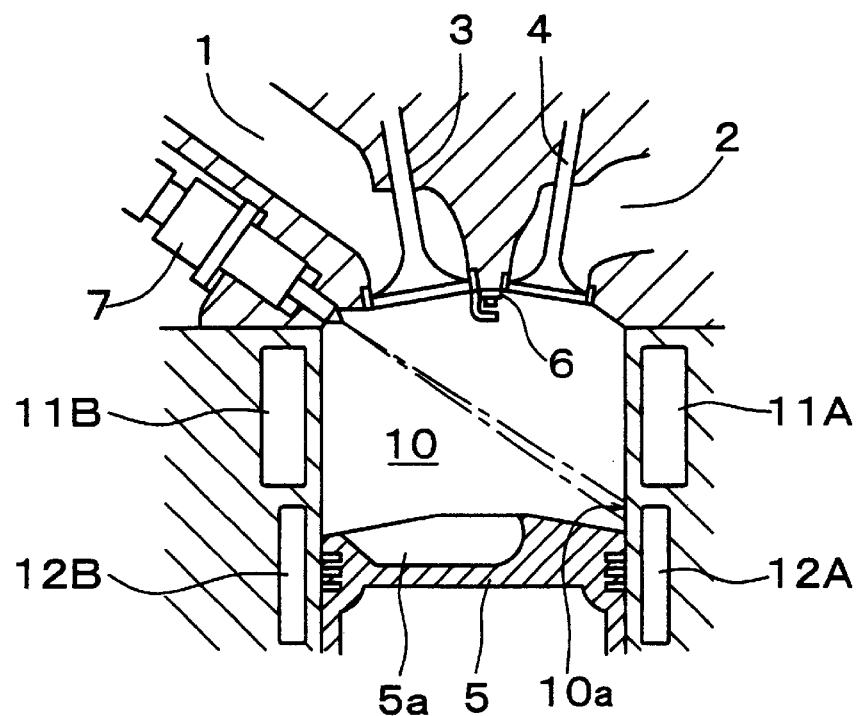
FIG. 1 schematically shows a longitudinal section of a direct-fuel-injection-type spark-ignition internal combustion engine in accordance with a first embodiment of the invention.

FIG. 1 schematically shows a longitudinal section of a direct-fuel-injection-type spark-ignition internal combustion engine in accordance with a first embodiment of the present invention. In FIG. 1, an intake port 1 and an exhaust port 2 are disposed in an upper section of a cylinder. The intake port 1 leads to the cylinder through an intake valve 3, and the exhaust port 2 leads to the cylinder through an exhaust valve 4. A piston 5 is disposed in the cylinder, and a recessed cavity 5a is formed in a top face of the piston 5. An ignition plug 6 is disposed substantially at the center of an upper section of a combustion chamber. A fuel injection valve 7 for directly injecting fuel into the cylinder from the periphery of the upper section of the cylinder is disposed to circumvent the intake port 1 and the exhaust port 2. To avoid vaporization of fuel, the fuel injection valve 7 is disposed on the side of the intake valve which is at a relatively low temperature due to the flow of intake air. The fuel injection valve 7 has a slit-like nozzle hole and injects fuel in the shape of a laterally extending fan with a small thickness. The invention, however, is not limited to this injection valve structure. That is, the fuel injection valve 7 may be designed to inject fuel in the shape of a circular cone or a column, for example.

When the engine is at a low load, the fuel injection valve 7 injects fuel in the latter half of a compression stroke so that the fuel is introduced into the cavity 5a formed in the top face of the piston 5. Although the fuel that has just been injected is liquid, it proceeds along a bottom face of the cavity 5a, and is gasified by the time of introduction into an area in the neighborhood of the ignition plug 6, and turns into a combustible mixture with good ignitability at the time of ignition. By thus forming the combustible mixture only in the neighborhood of the ignition plug 6, stratified charge combustion which permits combustion of lean mixture is realized in the cylinder as a whole.

Fuel spray in the shape of a laterally extending fan with a small thickness stretches out in the width direction when proceeding along the bottom face of the cavity 5a. Thus, this fuel spray can effectively absorb heat from a large area of the bottom face of the cavity 5a. A lateral wall of the cavity 5a opposed to the fuel injection valve is in the shape of an arc in a plan view. Thus, a central portion of fuel that has stretched out in the width direction above the bottom face of the cavity 5a is vested with an upward velocity component and proceeds toward the area in the neighborhood of the ignition plug 6. Both lateral portions of fuel that has stretched out in the width direction above the bottom face of the cavity 5a respectively collide with the lateral wall of the cavity 5a opposed to the fuel injection valve at acute angles, are vested with centripetal velocity components as well as upward velocity components, and proceed toward the area in the neighborhood of the ignition plug 6. Thus, fuel spray in the shape of a laterally extending fan with a small thickness can form a combustible mixture with better gasification properties in the neighborhood of the ignition plug 6 in comparison with fuel spray in the shape of a circular cone as in the related art. Thereby it becomes possible to increase a fuel injection amount at the time of stratified charge combustion and enlarge an operation range of stratified charge combustion toward the side of high load and high rotational speed in comparison with the related art.

However, when the engine is at a high load and thus requires a large amount of fuel, it is difficult to inject all of the needed fuel in the latter half of a compression stroke. Thus, stratified charge combustion is prohibited and homogeneous combustion is carried out. In homogeneous combustion, a homogeneous mixture formed in the cylinder at the time of ignition is ignited and burned. In homogeneous combustion, fuel is injected during an intake stroke to form the homogeneous mixture. However, since a large amount of fuel is injected, even if fuel injection is started in the former half of an intake stroke, fuel injection needs to be continued until the latter half of the intake stroke.

To carry out the aforementioned stratified charge combustion, the fuel injection valve 7 is designed to inject fuel diagonally downwards so that fuel injected in the latter half of a compression stroke is directed into the cavity 5a at a piston position at the time of the injection. Thus, at the time of homogeneous combustion, fuel injected in the latter half of an intake stroke collides with a cylinder bore portion 10a opposed to the nozzle hole of the fuel injection valve in a lower section of the cylinder bore 10, as indicated by an alternate long and short dash line in FIG. 1. (Portion 10a is also referred to as the "impingement portion" herein.)

A portion of the fuel colliding with the cylinder bore 10 adheres to the cylinder bore. If the entire cylinder bore 10 has been cooled by coolant, the adherent fuel is not sufficiently gasified, resides where it is, and does not contribute to combustion. Thus, it is necessary to increase a fuel injection amount to compensate for the adherent fuel. This causes problems such as deterioration of fuel consumption rate and an increase in frictional force between the cylinder bore 10 and the piston 5 due to dilution of engine oil by the adherent fuel.

The invention is intended to address such problems. In the first embodiment shown in FIG. 1, a coolant passage for cooling the cylinder bore 10 is composed of upper coolant passages 11A, 11B in the neighborhood of an upper section of the cylinder bore and lower coolant passages 12A, 12B in the neighborhood of a lower section of the cylinder bore. The lower coolant passages 12A, 12B are smaller in cross-section than the upper coolant passages 11A, 11B.

Figure 2:
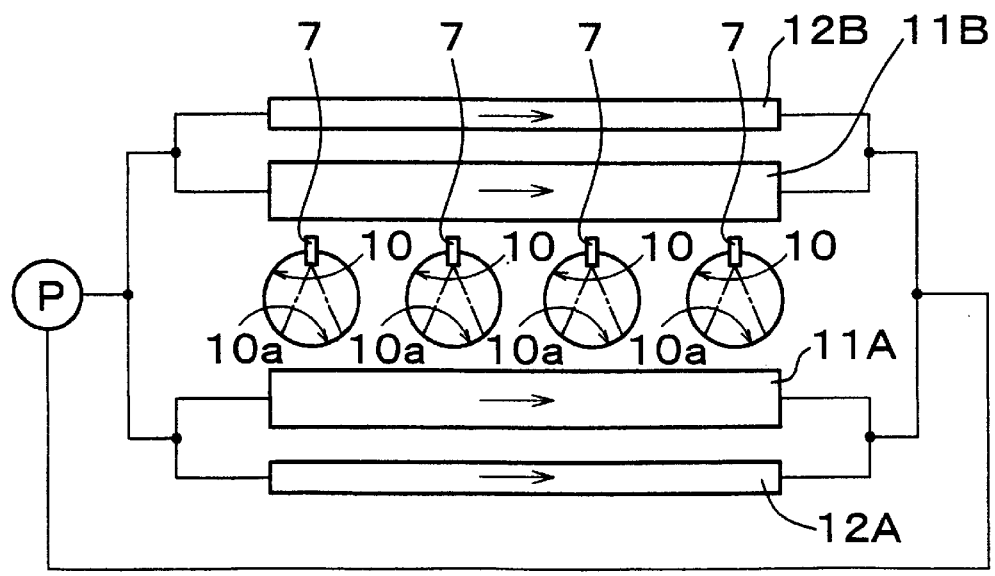
FIG. 2 is a system diagram of coolant passages of the first embodiment.

FIG. 2 is a system diagram of coolant passages of this embodiment. The coolant passages shown close to the cylinder bore 10 are the upper coolant passages 11A, 11B, and the coolant passages shown far from the cylinder bore

10 are the lower coolant passages 12A, 12B. A coolant pump P is coupled to the upper coolant passages 11A, 11B and the lower coolant passages 12A, 12B. Coolant discharged from the coolant pump P is substantially evenly distributed to opposed sides of the cylinder bore 10 with respect to the nozzle hole of the fuel injection valve. Then, on the side opposed to the nozzle hole of the fuel injection valve, the coolant is distributed to the upper coolant passage 11A and the lower coolant passage 12A. On the side of the fuel injection valve, the coolant is distributed to the upper coolant passage 11B and the lower coolant passage 12B. In this embodiment as well as later-described embodiments, the fuel injection valve 7 is disposed around the upper section of the cylinder. Hence, the opposite side of the side of the cylinder bore opposed to the nozzle hole of the fuel injection valve (i.e., the side opposite from the impingement portion 10*a*) will hereinafter be referred to as the fuel injection valve side. However, this does not limit the location of the fuel injection valve 7 to the periphery of the upper section of the cylinder.

Thus, coolant respectively flows through the coolant passages as indicated by arrows in FIG. 2. As described above, the lower coolant passages 12A, 12B are smaller in cross-section than the upper coolant passages 11A, 11B. For this reason, the amount of coolant flowing through the lower coolant passages 12A, 12B is smaller than the amount of coolant flowing through the upper coolant passages 11A, 11B.

Thus, according to an engine cooling system of this embodiment the cooling capacity for the lower section of the cylinder bore 10 is less than the cooling capacity for the upper section of the cylinder bore 10. The lower section of the cylinder bore 10 is not sufficiently cooled and reaches a high temperature. The fuel that is injected during the latter half of an intake stroke and that initially adheres to the impingement portion 10*a* opposed to the nozzle hole of the fuel injection valve is effectively gasified. Thereby it becomes possible to solve the aforementioned problems of deterioration of fuel consumption rate and dilution of engine oil.

Figure 3:
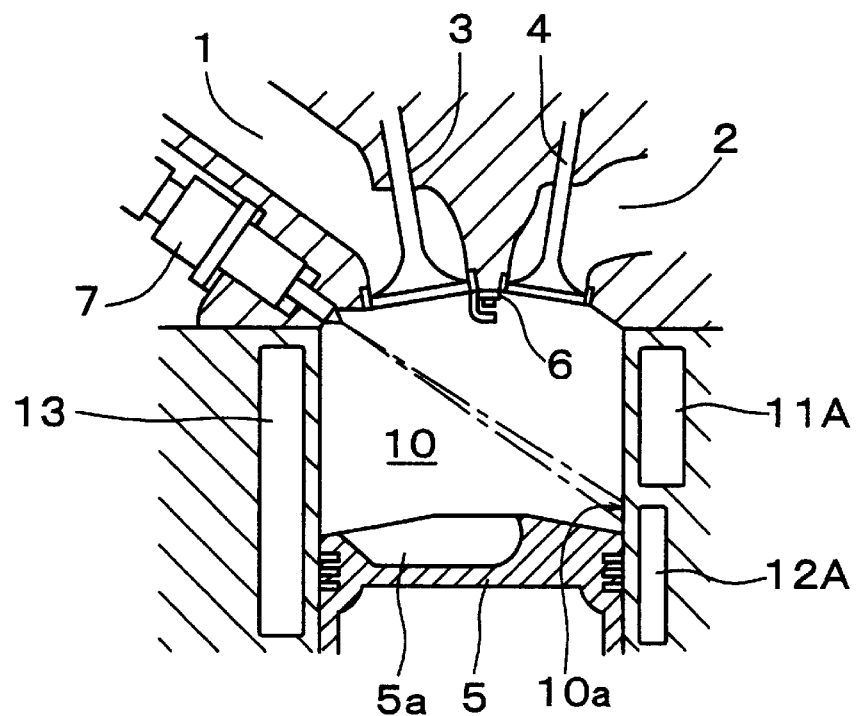
FIG. 3 schematically shows a longitudinal section of a direct-fuel-injection-type spark-ignition internal combustion engine in accordance with a second embodiment of the invention.
Figure 4:
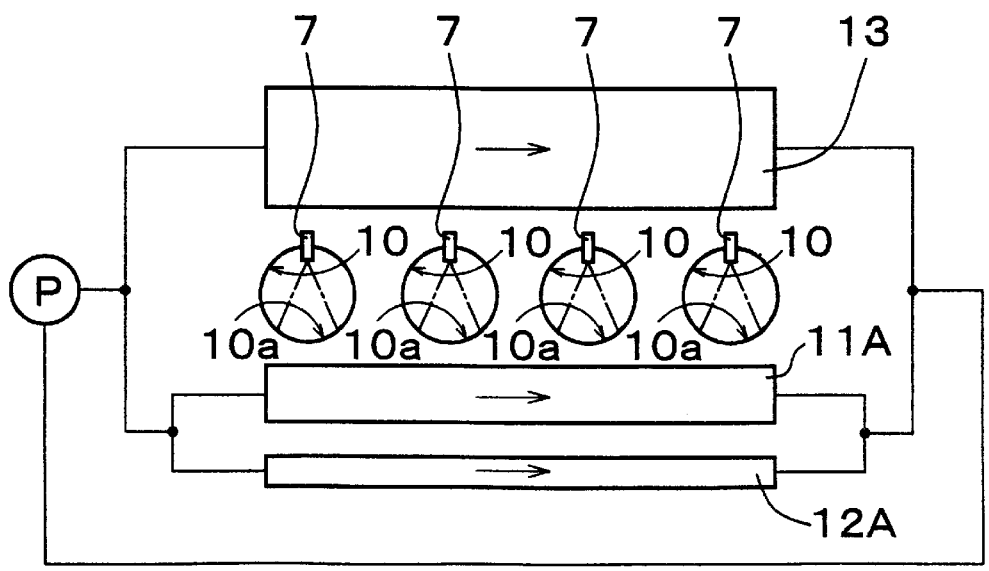
FIG. 4 is a system diagram of coolant passages of the second embodiment.

FIG. 3 schematically shows a longitudinal section of a direct-fuel-injection-type spark-ignition internal combustion engine in accordance with a second embodiment of the invention. FIG. 4 is a system diagram of coolant passages of the second embodiment. The description of the second embodiment will be limited to what is different from the first embodiment. In this embodiment, the upper coolant passage and the lower coolant passage are integrated with each other on the fuel injection valve side, whereby a fuel-injection-valve-side coolant passage 13 is formed. On the side opposed to the nozzle hole of the fuel injection valve, the lower coolant passage 12A is smaller in cross-section than the upper coolant passage 11A.

Due to such a construction, only on the side opposed to the nozzle hole of the fuel injection valve, the amount of coolant flowing through the lower coolant passage 12A is smaller than the amount of coolant flowing through the upper coolant passage 11A. On the side opposed to the nozzle hole of the fuel injection valve, the cooling capacity for the lower section of the cylinder bore 10 is reduced. Therefore, fuel that is injected during the latter half of an intake stroke and that initially adheres to the impingement portion 10*a* opposed to the nozzle hole of the fuel injection valve can be effectively gasified. Thus, as in the first embodiment, the second embodiment can solve the problems of deterioration of fuel consumption rate and dilution of engine oil.

Figure 5:
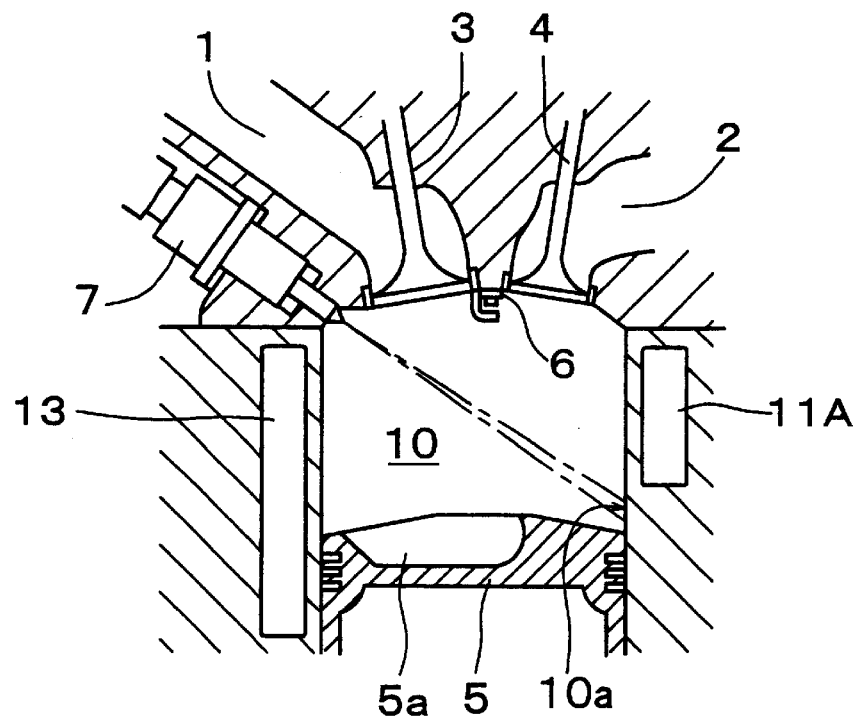
FIG. 5 schematically shows a longitudinal section of a direct-fuel-injection-type spark-ignition internal combustion engine in accordance with a third embodiment of the invention.
Figure 6:
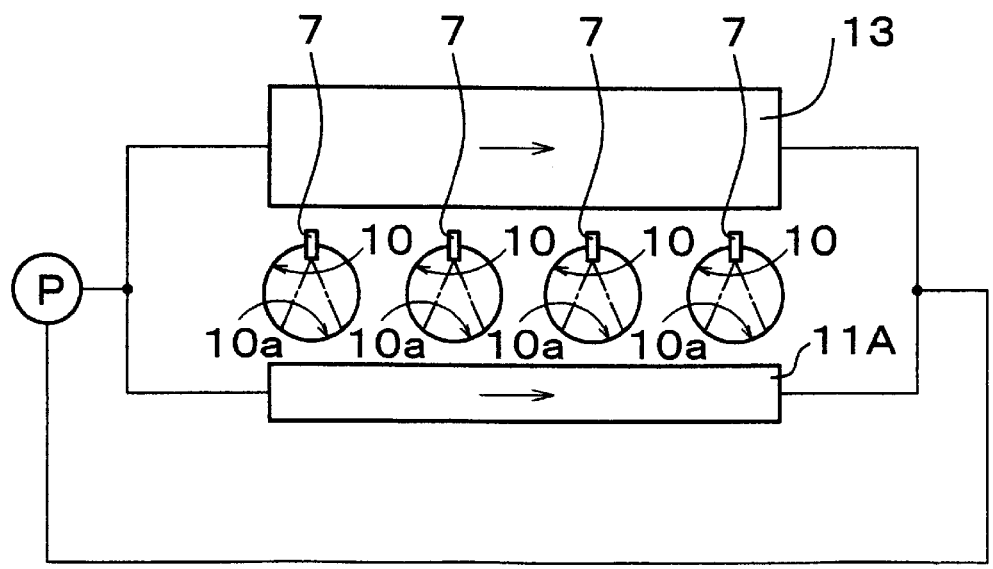
FIG. 6 is a system diagram of coolant passages of the third embodiment.

FIG. 5 schematically shows a longitudinal section of a direct-fuel-injection-type spark-ignition internal combustion engine in accordance with a third embodiment of the invention. FIG. 6 is a system diagram of coolant passages of the third embodiment. The description of the third embodiment will be limited to what is different from the second embodiment. In this embodiment, there is no lower coolant passage on the side opposed to the nozzle hole of the fuel injection valve.

Due to such a construction, on the side opposed to the nozzle hole of the fuel injection valve, the lower section of the cylinder bore 10 is not forcibly cooled and is thus maintained at a higher temperature. The fuel that is injected during the latter half of an intake stroke and that initially adheres to the impingement portion 10*a* opposed to the nozzle hole of the fuel injection valve can be more effectively gasified. Thus, the third embodiment can solve the problems of deterioration of fuel consumption rate and dilution of engine oil more reliably than the second embodiment.

Figure 7:
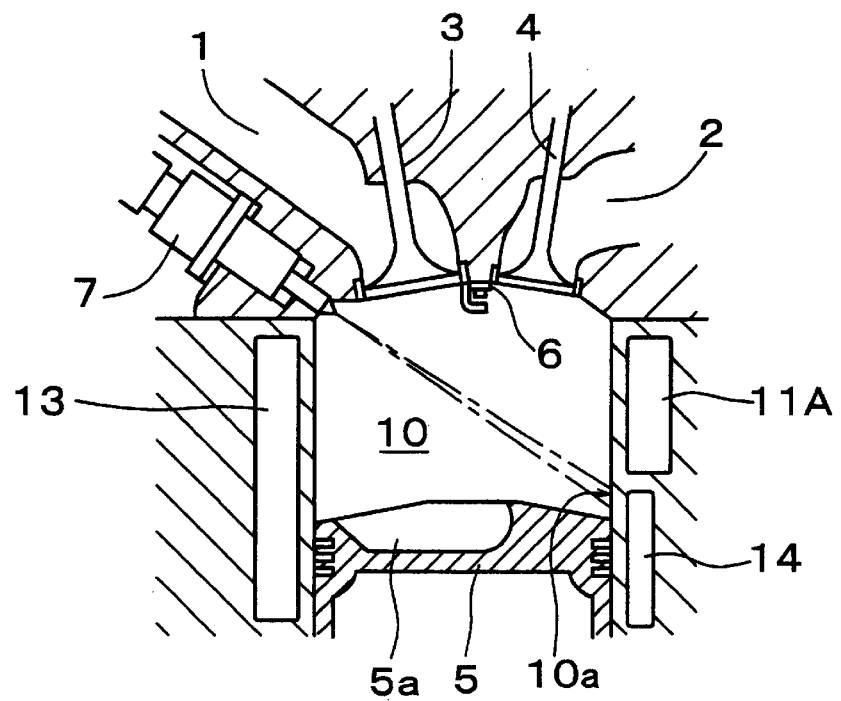
FIG. 7 schematically shows a longitudinal section of a direct-fuel-injection-type spark-ignition internal combustion engine in accordance with a fourth embodiment of the invention.
Figure 8:
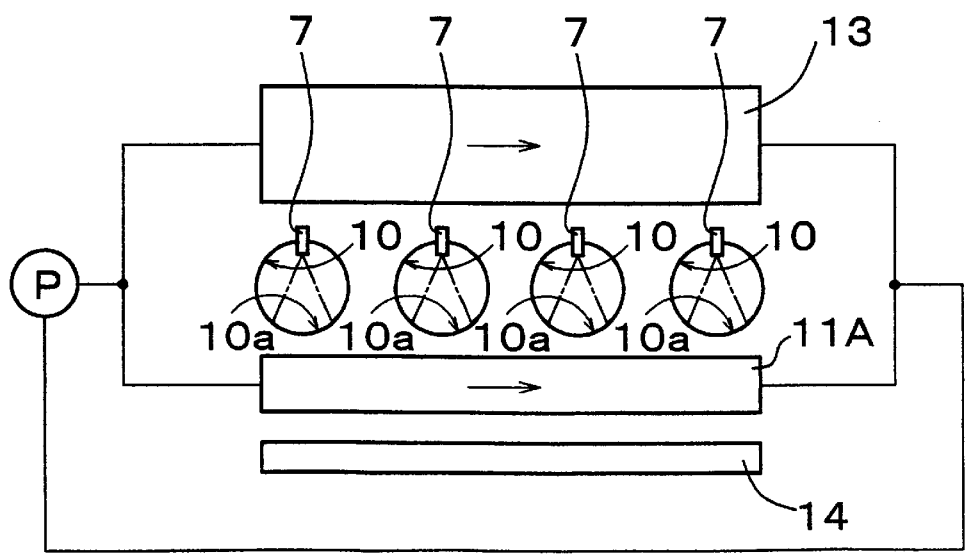
FIG. 8 is a system diagram of coolant passages of the fourth embodiment.

FIG. 7 schematically shows a longitudinal section of a direct-fuel-injection-type spark-ignition internal combustion engine in accordance with a fourth embodiment of the invention. FIG. 8 is a system diagram of coolant passages of the fourth embodiment. The description of the fourth embodiment will be limited to what is different from the third embodiment. In this embodiment, in addition to the construction wherein there is no lower coolant passage on the side opposed to the nozzle hole of the fuel injection valve, an adiabatic air layer 14 is formed in the neighborhood of the lower section of the cylinder bore 10.

In general, a cylinder block in which the cylinder bore 10 is formed is made of metal. By providing an air layer with a lower heat transfer rate than metal, the impingement portion 10*a* opposed to the nozzle hole of the fuel injection valve in the cylinder bore 10 can be maintained at a higher temperature. Thereby it becomes possible to more effectively gasify fuel that is injected during the latter half of an intake stroke and that initially adheres to the portion 10*a* opposed to the nozzle of the fuel injection valve. Thus, the fourth embodiment can solve the problems of deterioration of fuel consumption rate and dilution of engine oil more reliably than the third embodiment. Although the air layer is formed as an adiabatic layer in this embodiment, it goes without saying that other gaseous layers, liquid layers or solid layers with a lower heat transfer rate than the metal forming the cylinder block may be formed.

Figure 9:
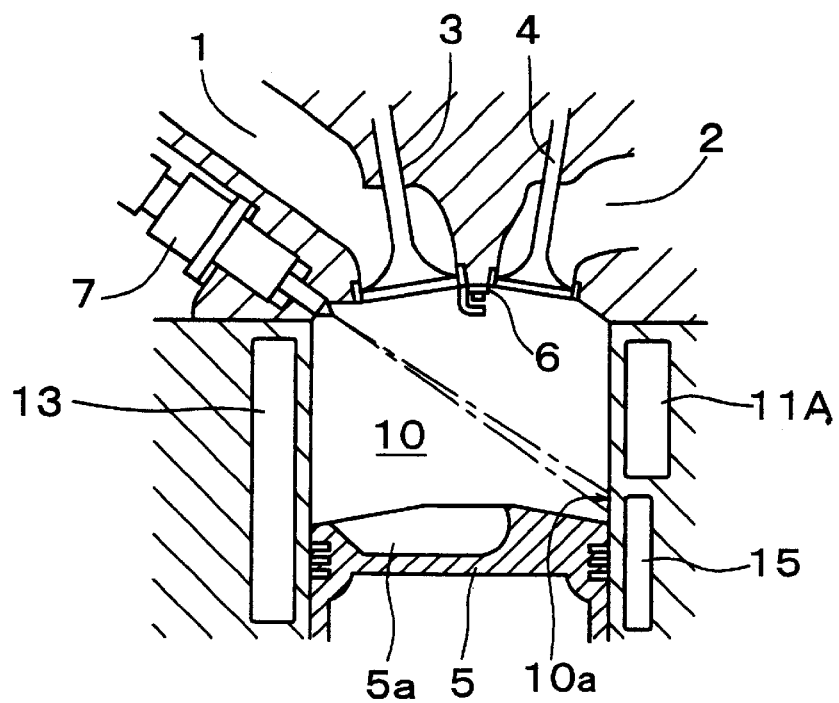
FIG. 9 schematically shows a longitudinal section of a direct-fuel-injection-type spark-ignition internal combustion engine in accordance with a fifth embodiment of the invention.
Figure 10:
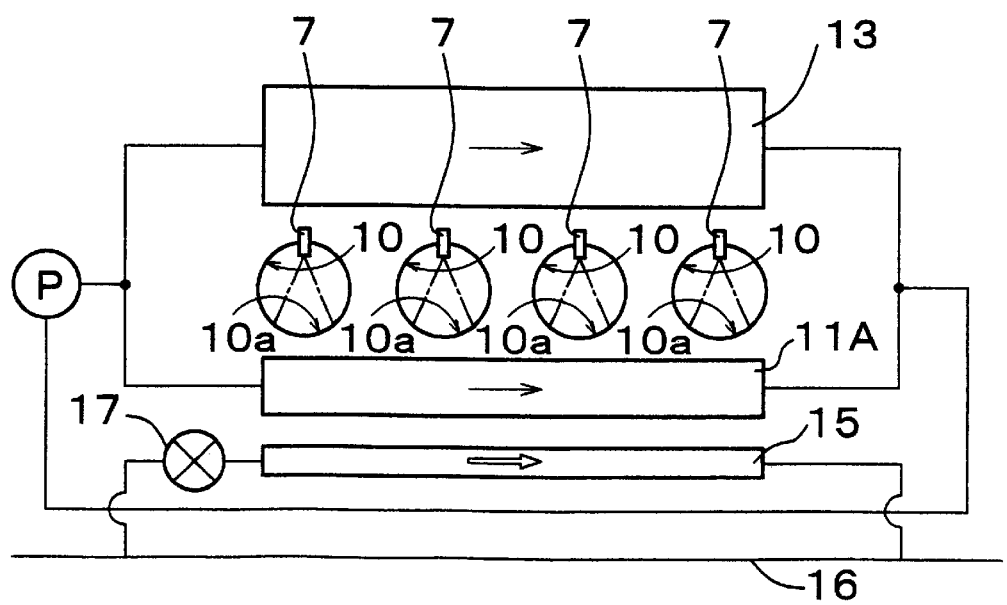
FIG. 10 is a system diagram of coolant passages of the fifth embodiment.

FIG. 9 schematically shows a longitudinal section of a direct-fuel-injection-type spark-ignition internal combustion engine in accordance with a fifth embodiment of the invention. FIG. 10 is a system diagram of coolant passages of the fifth embodiment. The description of the fifth embodiment will be limited to what is different from the fourth embodiment. In this embodiment, on the side opposed to the nozzle hole of the fuel injection valve, an exhaust passage 15 is formed and functions as heating means in the neighborhood of the lower section of the cylinder bore 10, instead of the adiabatic layer. As indicated by a hollow arrow in FIG. 10, exhaust gas flows through the exhaust passage 15.

The upper section of the cylinder bore 10 is exposed to combustion gas at an extremely high temperature in the initial stage of a combustion stroke and thus reaches an extremely high temperature. On the other hand, the lower section of the cylinder bore 10 is only exposed to combustion gas in the latter half of a combustion stroke and thus does not reach a very high temperature. Thereafter, when an intake stroke begins after an exhaust stroke, intake air introduced into the cylinder also cools the cylinder bore 10. In the latter half of an intake stroke, the lower section of the cylinder bore 10 is lower in temperature than exhaust gas that has just been discharged from the cylinder.

Thus, if an exhaust passage is formed in the neighborhood of the lower section of the cylinder bore 10 on the side opposed to the nozzle hole of the fuel injection valve, the impingement portion 10a opposed to the nozzle hole of the fuel injection valve in the lower section of the cylinder bore 10 can be heated by exhaust gas that has just been discharged from the cylinder and that is at a high temperature. Thus, the impingement portion 10a opposed to the nozzle hole of the fuel injection valve further rises in temperature and becomes capable of gasifying adherent fuel almost instantaneously. As a result, the fifth embodiment can more reliably solve the problems of deterioration of fuel consumption rate and dilution of engine oil.

The exhaust passage 15 may be designed as part of a main exhaust passage of the engine through which exhaust gas flows constantly. However, in this embodiment, the exhaust passage 15 is designed as a branch exhaust passage which branches off from a main exhaust passage 16 through a control valve 17, as can be seen from FIG. 10. At the time of stratified charge combustion, which does not require heating of the impingement portion 10a opposed to the nozzle hole of the fuel injection valve in the cylinder bore 10, the control valve 17 is closed so that exhaust gas does not flow through the branch exhaust passage 15. Thus, at the time of stratified charge combustion, the impingement portion 10a opposed to the nozzle hole of the fuel injection valve in the cylinder bore 10 is maintained at almost the same temperature as in the fourth embodiment wherein the adiabatic layer is formed.

As described above, regardless of whether stratified charge combustion or homogeneous combustion is carried out, the upper section of the cylinder bore 10 is exposed to combustion gas at an extremely high temperature in the initial stage of a combustion stroke and thus reaches an extremely high temperature. Thus, the engine cooling system of the first through fifth embodiments ensures high cooling capacity for the upper section of the cylinder bore 10 so as to prevent overheating. On the other hand, the lower section of the cylinder bore 10 is exposed to combustion gas only in the latter half of a combustion stroke and thus does not reach a very high temperature. For this reason, there is no possibility of the occurrence of overheating even though cooling capacity is reduced as in the first and second embodiments, even though no cooling operation is performed as in the third embodiment, even though the adiabatic layer is formed as in the fourth embodiment, or even though the heating means is provided as in the fifth embodiment.

In view of intake air filling efficiency, it is preferable that the interior of the cylinder be at a low temperature. Thus, in the fifth embodiment, it is advantageous to stop an unnecessary heating operation of the impingement portion 10a opposed to the nozzle hole of the fuel injection valve in the cylinder bore 10 when stratified charge combustion is carried out. In the second, third, fourth and fifth embodiments, high cooling capacity for the lower section of the cylinder bore 10 on the fuel injection valve side is ensured. Therefore, regardless of whether stratified charge combustion or homogeneous combustion is carried out, the enhancement of intake air filling efficiency can be effectively achieved.

On the other hand, in the lower section of the cylinder bore 10, the cooling capacity on the fuel injection valve side does not coincide with the cooling capacity on the side opposed to the fuel injection valve. Thus, phenomena such as swaying defacement of a piston ring may be caused. To prevent such phenomena, the cooling capacity for the lower section of the cylinder bore 10 on the fuel injection valve side needs to coincide with the cooling capacity for the lower section of the cylinder bore 10 on the side opposed to the fuel injection valve. For this purpose, in the neighborhood of the lower section of the cylinder bore 10 on the fuel injection valve side as well as on the side opposed to the fuel injection valve, the coolant passage may be dispensed with in the third embodiment, an adiabatic layer may be formed in the fourth embodiment, and an exhaust passage may be formed in the fifth embodiment.

Figure 11:
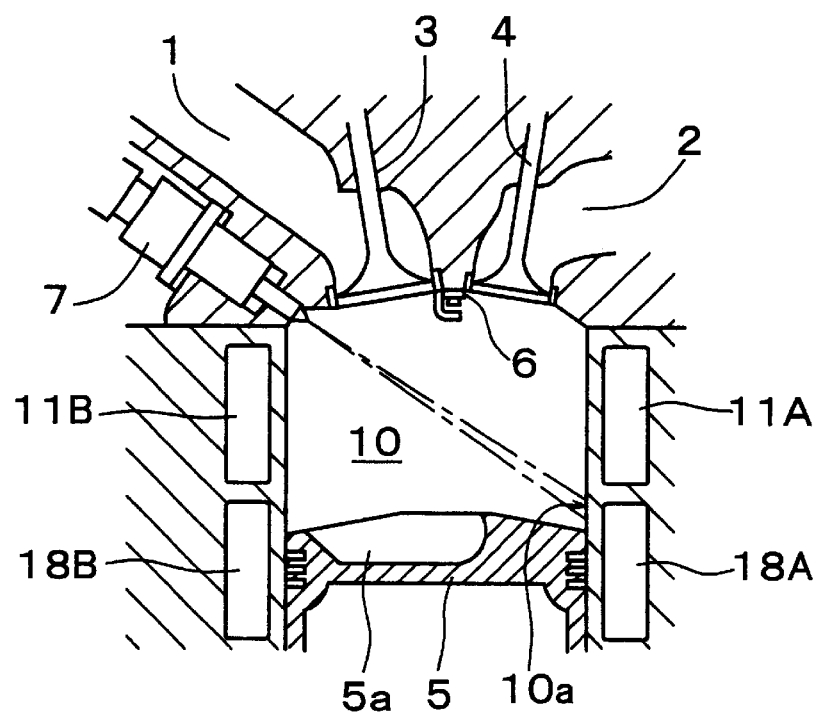
FIG. 11 schematically shows a longitudinal section of a direct-fuel-injection-type spark-ignition internal combustion engine in accordance with a sixth embodiment of the invention.
Figure 12:
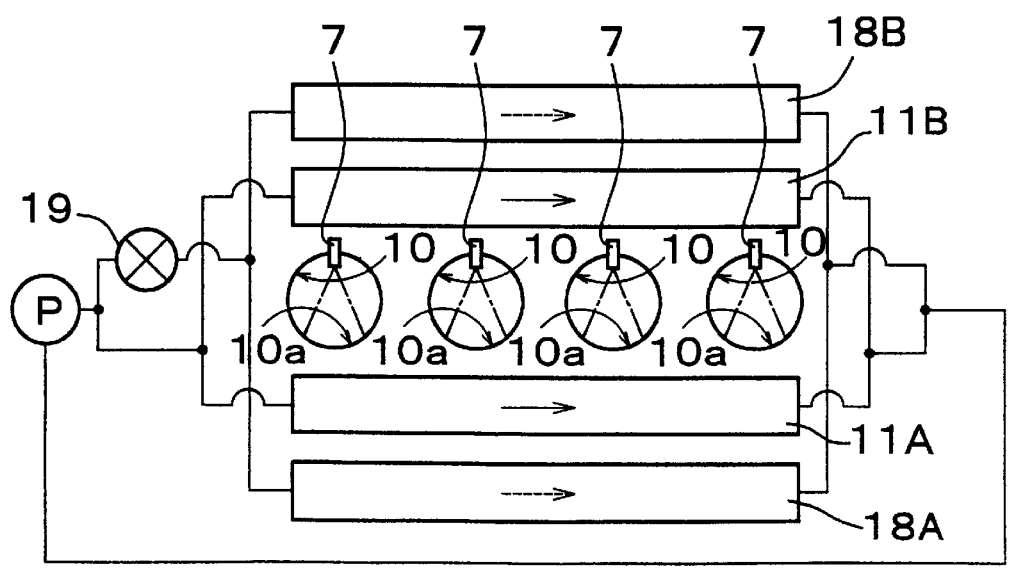
FIG. 12 is a system diagram of coolant passages of the sixth embodiment.

FIG. 11 schematically shows a longitudinal section of a direct-fuel-injection-type spark-ignition internal combustion engine in accordance with a sixth embodiment of the invention. FIG. 12 is a system diagram of coolant passages of the sixth embodiment. In this embodiment, the upper coolant passages 11A, 11B and lower coolant passages 18A, 18B are provided as coolant passages for cooling the cylinder bores 10. The upper coolant passages 11A, 11B and the lower coolant passages 18A, 18B are substantially equal in cross-section.

As can be seen from the system diagram of the coolant passages, coolant discharged from the coolant pump P is substantially evenly distributed to the upper coolant passages 11A, 11B and the lower coolant passages 18A, 18B through a control valve 19. Thereafter, the coolant is respectively distributed to the fuel injection valve side and the side opposed to the fuel injection valve. Thus, at the time of stratified charge combustion, a substantially uniform amount of coolant respectively flows through the coolant passages 11A, 11B, 18A and 18B. Thereby the upper and lower sections of the cylinder bore 10 are effectively cooled. That is, the entire cylinder bore 10 is effectively cooled and the interior of the cylinder falls in temperature. As a result, it is possible to realize stratified charge combustion with high intake air filling efficiency.

At the time of homogeneous combustion, the opening degree of the control valve 19 is reduced so that the amount of coolant flowing through the lower coolant passages 18A, 18B is reduced. Thus, the cooling capacity for the lower section of the cylinder bore 10 is made lower than the cooling capacity for the upper section of the cylinder bore 10. Hence, the lower section of the cylinder bore 10 is not sufficiently cooled and thus reaches a high temperature. As a result, fuel that is injected during the latter half of an intake stroke and that initially adheres to the impingement portion 10a opposed to the nozzle hole of the fuel injection valve is effectively gasified, whereby it becomes possible to solve the aforementioned problems of deterioration of fuel consumption rate and dilution of engine oil.

Figure 13:
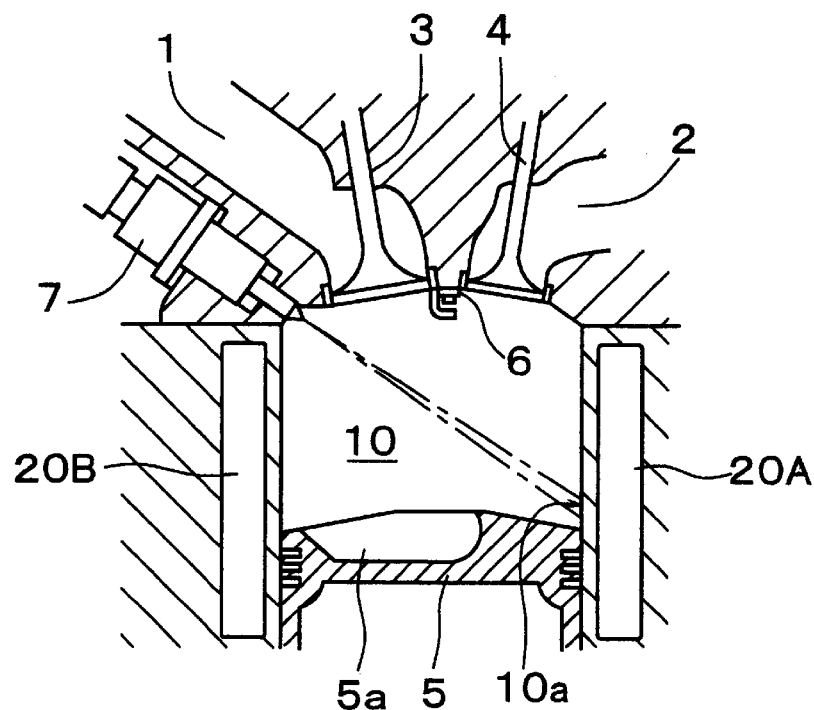
FIG. 13 schematically shows a longitudinal section of a direct-fuel-injection-type spark-ignition internal combustion engine in accordance with a seventh embodiment of the invention.
Figure 14:
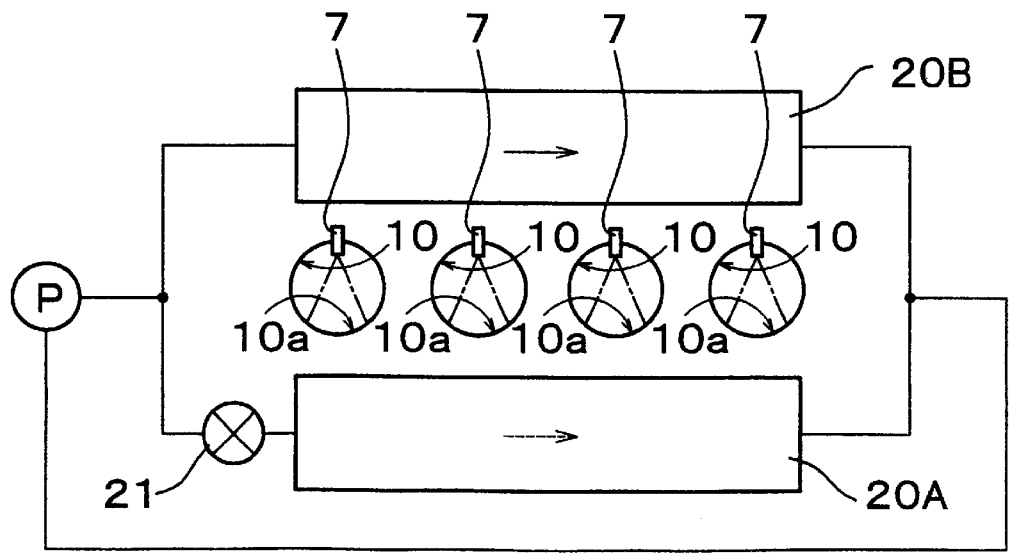
FIG. 14 is a system diagram of coolant passages of the seventh embodiment.

FIG. 13 schematically shows a longitudinal section of a direct-fuel-injection-type spark-ignition internal combustion engine in accordance with a seventh embodiment of the invention. FIG. 14 is a system diagram of coolant passages of the seventh embodiment. In this embodiment, a coolant passage 20A on the side opposed to the fuel injection valve and a coolant passage 20B on the fuel injection valve side are provided as coolant passages for cooling the cylinder bores 10. The coolant passages 20A, 20B are substantially equal in cross-section.

As can be seen from the system diagram of the coolant passages, coolant discharged from the coolant pump P is substantially evenly distributed to the coolant passage 20B on the fuel injection valve side and the coolant passage 20A on the side opposed to the fuel injection valve through a control valve 21. Thus, at the time of stratified charge combustion, a substantially uniform amount of coolant respectively flows through the coolant passages 20A, 20B. Thereby the cylinder bore 10 is effectively cooled both on the side opposed to the fuel injection valve and on the fuel injection valve side. That is, the entire cylinder bore 10 is effectively cooled and the interior of the cylinder falls in temperature. As a result, it is possible to realize stratified charge combustion with high intake air filling efficiency.

At the time of homogeneous combustion, the opening degree of the control valve 21 is reduced so that the amount of coolant flowing through the coolant passage 20A on the side opposed to the fuel injection valve is reduced. Thus, the cooling capacity for the cylinder bore 10 on the side opposed to the fuel injection valve is made lower than the cooling capacity for the cylinder bore 10 on the fuel injection valve side. Hence, the cylinder bore 10 on the side opposed to the fuel injection valve is not sufficiently cooled and thus reaches a high temperature. As a result, fuel that is injected during the latter half of an intake stroke and that initially adheres to the impingement portion 10a opposed to the nozzle hole of the fuel injection valve is effectively gasified, whereby it becomes possible to solve the aforementioned problems of deterioration of fuel consumption rate and dilution of engine oil.

In this embodiment, at the time of homogeneous combustion, the cooling capacity for the upper section of the cylinder bore 10 on the side opposed to the fuel injection valve is reduced. Hence, the upper section of the cylinder bore 10, which reaches an extremely high temperature, is not sufficiently cooled. As described above, sufficient cooling capacity is ensured at the time of stratified charge combustion. This does not mean that the cooling capacity is always insufficient. Therefore, there is no possibility of the occurrence of overheating.

Figure 15:
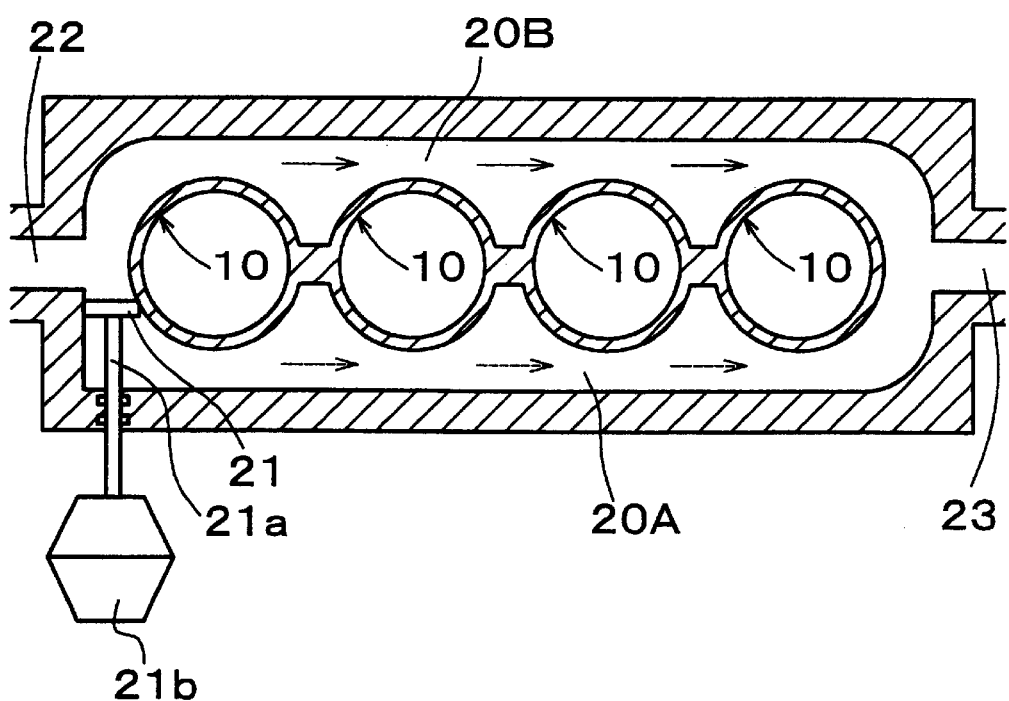
FIG. 15 is a cross-sectional view of a cylinder block of the seventh embodiment.

FIG. 15 is a cross-sectional view of a specific structure of a cylinder block in accordance with this embodiment. In FIG. 15, the coolant passage 20A on the side opposed to the fuel injection valve and the coolant passage 20B on the fuel injection valve side are integrated with each other to define a space surrounding cylinder bores 10 which are aligned with one another. In this space, an inlet 22 for coolant is formed at one end, and an outlet 23 for coolant is formed at the other end. A longitudinal valve body 21 designed as a control valve which can close the space on the side opposed to the fuel injection valve is disposed in the neighborhood of the inlet 22. An operating shaft 21a of the longitudinal valve body 21 penetrates the cylinder block outwards in a watertight manner and is connected to a diaphragm 21b, which functions as an actuator. Thus, if the longitudinal valve body 21 closes the coolant passage 20A on the side opposed to the fuel injection valve as shown in FIG. 15, coolant stagnates in the coolant passage 20A on the side opposed to the fuel injection valve, whereby it becomes possible to significantly reduce the cooling capacity.

If the longitudinal valve body is reduced in height so that only a lower section of the space on the side opposed to the fuel injection valve is closed, it is possible to stagnate coolant only in the lower section of the coolant passage 20A on the side opposed to the fuel injection valve. Thus, it is possible to sufficiently cool the upper section of the cylinder bore 10 at the time of homogeneous combustion. Needless to say, even though the longitudinal valve body 21 does not close the entirety or the lower section of the coolant passage 20A on the side opposed to the fuel injection valve, if the coolant passage 20A is reduced in cross-section through the longitudinal valve body 21, the cooling capacity for the entirety or the lower section of the cylinder bore 10 on the side opposed to the fuel injection valve decreases. As a result, it is possible to promote gasification of adherent fuel.

In this embodiment, since the number of coolant passages is small, the overall structure can be simplified. As a matter of course, a partition wall may be provided between the upper section and the lower section of the cylinder bore 10 so that coolant constantly flows on the fuel injection valve side and the side opposed to the fuel injection valve in the upper section and that the upper section is sufficiently cooled. Also, the lower section may be exclusively constructed as shown in FIG. 15 so that the coolant passage on the side opposed to the fuel injection valve is closed or reduced in cross-section by the longitudinal valve body at the time of homogeneous combustion. Because this construction not only achieves effective gasification of adherent fuel at the time of homogeneous combustion but also cools the upper sections of the respective cylinder bores 10 constantly and sufficiently, the occurrence of overheating can be more reliably prevented.

Figure 16:
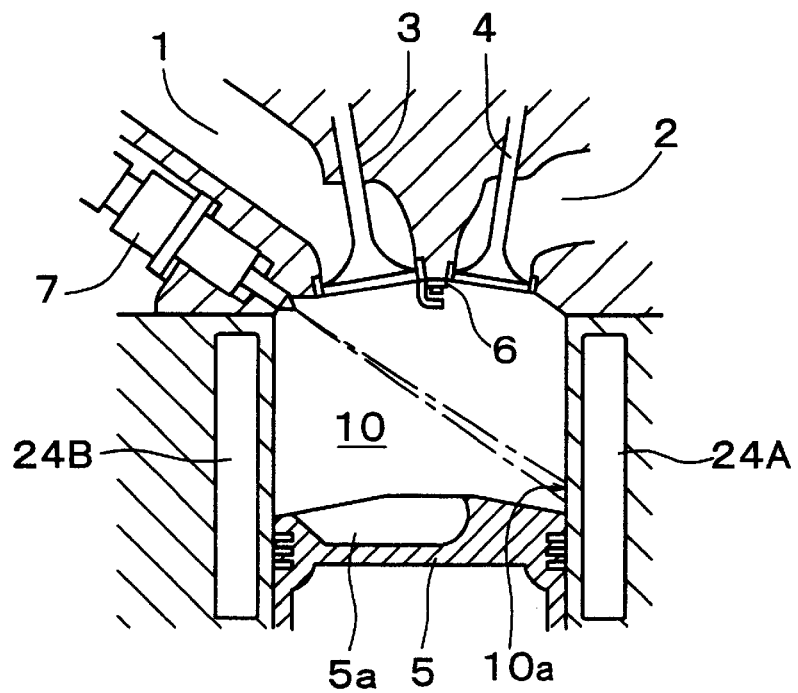
FIG. 16 schematically shows a longitudinal section of a direct-fuel-injection-type spark-ignition internal combustion engine in accordance with an eighth embodiment of the invention.
Figure 17:
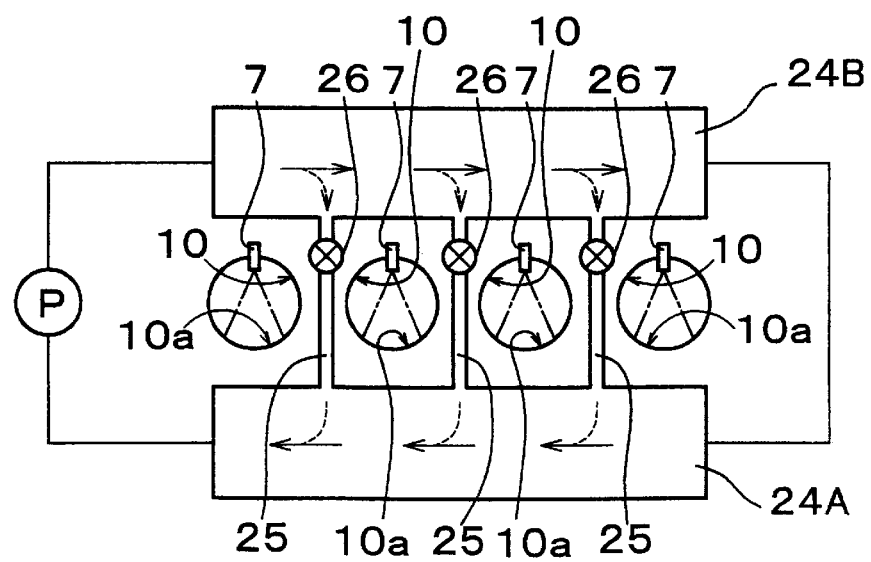
FIG. 17 is a system diagram of coolant passages of the eighth embodiment.

FIG. 16 schematically shows a longitudinal section of a direct-fuel-injection-type spark-ignition internal combustion engine in accordance with an eighth embodiment of the invention. FIG. 17 is a system diagram of coolant passages of the eighth embodiment. In this embodiment, a coolant passage 24A on the side opposed to the fuel injection valve and a coolant passage 24B on the fuel injection valve side are provided as coolant passages for cooling the cylinder bores 10. The coolant passages 24A, 24B are substantially equal in cross-section. The coolant passage 24A on the side opposed to the fuel injection valve and the coolant passage 24B on the fuel injection valve side communicate with each other through communication passages 25, each of which extends between two adjacent ones of the cylinder bores. A control valve 26 which is closed during a period of homogeneous combustion is disposed in each communication passage 25.

As can be seen from the system diagram of the coolant passages, coolant discharged from the coolant pump P first flows through the coolant passage 24B on the fuel injection valve side and then flows through the coolant passage 24A on the side opposed to the fuel injection valve. Thus, at the time of homogeneous combustion, coolant which has flowed through the coolant passage 24B on the fuel injection valve side, which has cooled the respective cylinder bores on the fuel injection valve side and which has reached a high temperature flows through the coolant passage 24A on the side opposed to the fuel injection valve. As a result, the respective cylinder bores 10 on the side opposed to the fuel injection valve are not sufficiently cooled, and adherent fuel can be effectively gasified.

At the time of stratified charge combustion, the control valves 26 are opened so that coolant flows from the coolant passage 24B on the fuel injection valve side to the coolant passage 24A on the side opposed to the fuel injection valve through the communication passages 25 as indicated by dotted lines. If one of the cylinder bores 10 is located close to the coolant pump P, coolant which has only cooled a small number of cylinder bores 10 cools that cylinder bore 10 on the side opposed to the fuel injection valve. Thus, sufficient cooling capacity is ensured, and it is possible to realize stratified charge combustion with high intake air filling efficiency.

As for the cylinder bore 10 located farthest from the coolant pump P, the temperature of coolant for cooling the side opposed to the fuel injection valve remains substantially unchanged regardless of whether homogeneous combustion or stratified charge combustion is carried out. However, as for the cylinder bore 10 located closest to the coolant pump P, at the time of homogeneous combustion, coolant which has cooled all the cylinder bores 10 on the fuel injection valve side, which has cooled the other cylinder bores 10 on the side opposed to the fuel injection valve and which has reached a considerably high temperature flows in the neighborhood of the side opposed to the fuel injection valve. Thus, insufficient cooling enables effective gasification of adherent fuel at the time of homogeneous combustion. At the time of stratified charge combustion, coolant which has only cooled the cylinder bores on the fuel injection valve side and which is at a low temperature flows in the neighborhood of the side opposed to the fuel injection valve, whereby the cylinder bores are effectively cooled. Thus, the closer one of the cylinder bores 10 is located to the coolant pump P, the more effectively the cooling operation at the time of stratified charge combustion and the gasification of adherent fuel at the time of homogeneous combustion can be achieved.

Figure 18:
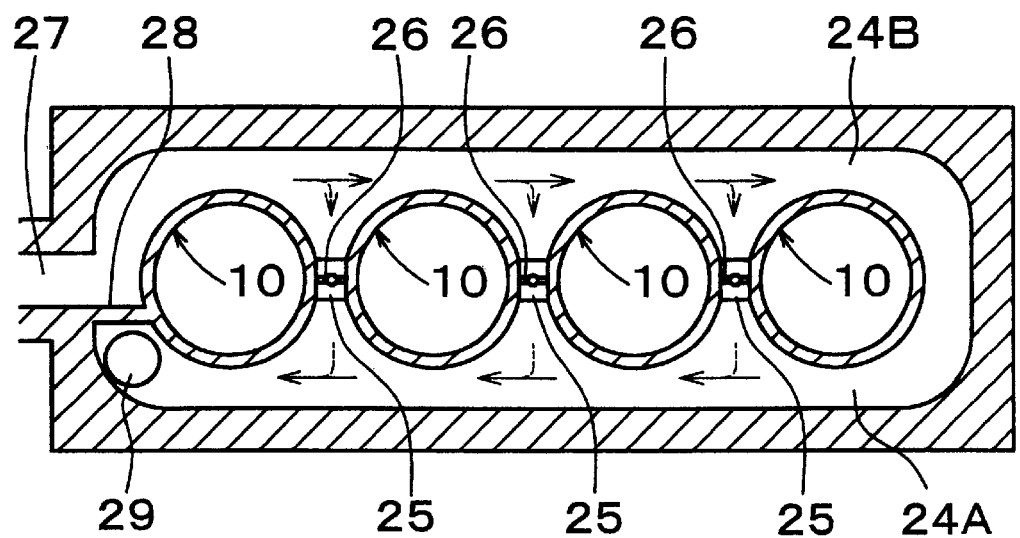
FIG. 18 is a cross-sectional view of a cylinder block of the eighth embodiment.

FIG. 18 its a cross-sectional view of a specific structure of a cylinder block in accordance with this embodiment. In FIG. 18, the coolant passage 24A on the side opposed to the fuel injection valve and the coolant passage 24B on the fuel injection valve side are integrated with each other to define a space surrounding cylinder bores 10 which are aligned with one another. An inlet 27 for coolant is formed at one end of the coolant passage 24B on the fuel injection valve side. A partition wall 28, which separates the coolant passage 24B on the fuel injection valve side from the coolant passage 24A on the side opposed to the fuel injection valve, is provided in the neighborhood of the inlet 27. An outlet 29 for coolant is formed in the neighborhood of the partition wall 28 in the coolant passage 24A on the side opposed to the fuel injection valve. The coolant passage 24B on the fuel injection valve side and the coolant passage 24A on the side opposed to the fuel injection valve communicate with each other through the communication passages 25. A butterfly-valve-type control valve 26 is disposed in each of the communication passages 25. A step motor or the like can be used as an actuator for the control valve.

If the control valves 26 are closed as shown in FIG. 18, coolant which flows past the cylinder bores 10 on the guide opposed to the fuel injection valves reaches a high temperature. Thus, insufficient cooling enables effective gasification of fuel that has adhered to the portion opposed to the fuel injection valve in each of the cylinder bores 10. If the control valves 26 are opened, the cylinder bore 10 located closer to the inlet 27 for coolant can be cooled on the side opposed to the fuel injection valve by coolant at a lower temperature. Hence, it becomes possible to reduce a temperature in the cylinder.

In this embodiment, in order to ensure reduction of a temperature in the cylinder at the time of stratified charge combustion, it is preferable to form a plurality of communication passages 25 and control valves 26 between two adjacent ones of the cylinder bores in the direction of height.

In this embodiment, since the number of coolant passages is small, the overall structure can be simplified. As a matter of course, the following construction can be adopted. A partition wall is provided between the upper section and the lower section of each of the cylinder bores 10. There is no control valve provided in the upper section. The coolant passage on the side opposed to the fuel injection valve and the coolant passage on the fuel injection valve side constantly communicate with each other through the communication passages extending between two adjacent ones of the cylinder bores so that the upper sections of the cylinder bores 10 are sufficiently cooled. The lower section is exclusively constructed as shown in FIG. 18, and the control valves 26 are closed at the time of homogeneous combustion. This construction not only achieves effective gasification of adherent fuel at the time of homogeneous combustion but also cools the upper sections of the cylinder bores 10 sufficiently and constantly. Therefore, the occurrence of overheating can be prevented more reliably.

In the seventh and eighth embodiments, the overall cooling capacity for the fuel injection valve side of the cylinder bore 10 is reduced at the time of homogeneous combustion. Hence, it is not particularly necessary that the nozzle hole of the fuel injection valve that is used be directed towards the lower section of the cylinder bore 10. For example, the nozzle hole of the fuel injection valve may be directed towards the upper section of the cylinder bore so that combustible mixture is directly formed in the neighborhood of the ignition plug at the time of stratified charge combustion without using the cavity in the top face of the piston.

Although the engine cooler uses coolant in all the aforementioned embodiments, this does not limit the scope of the invention. For example, other cooling fluids such as oil may also be used. In the first through fifth embodiments, the cooling capacity of the engine cooler remains unchanged regardless of whether stratified charge combustion or homogeneous combustion is carried out. Therefore, cooling fins may be provided as engine cooling means. Also, the cooling fins may be varied in size or number to create a difference in cooling capacity as described above.

While the invention has been described with reference to preferred embodiments thereof, it is to be understood that the invention is not limited to the disclosed embodiments or constructions. On the contrary, the invention is intended to cover various modifications and equivalent arrangements. In addition, while the various elements of the invention are shown in various combinations and configurations which are exemplary, other combinations and configurations, including more, less or only a single embodiment, are also within the spirit and scope of the invention.

What is claimed is:

1. A direct-fuel-injection spark-ignition internal combustion engine which switches its combustion mode in accordance with an operating state of the engine between stratified charge combustion in which fuel is injected during a latter half of a compression stroke and homogeneous combustion in which fuel is injected during an intake stroke, comprising:

a cylinder bore into which the fuel is injected to cause the stratified charge combustion or the homogeneous combustion;

a fuel injection valve located in an upper section of the cylinder bore, and which directs fuel toward an impingement portion of the cylinder bore located opposed to the fuel injection valve in a lower section of the cylinder bore; and a cooler which cools the cylinder bore so as to suppress a fall in temperature of at least one area of the cylinder adjacent to the impingement portion in comparison with a fall in temperature of the other area of the cylinder bore than the at least one area adjacent to the impingement portion, the other area including an area above the impingement portion on a same side of the cylinder bore as the impingement portion.

2. The direct-fuel-injection spark-ignition internal combustion engine according to claim 1, wherein:

the cooler has a first cooling portion and a second cooling portion, the first cooling portion cools an area close to the upper section of the cylinder bore; and the second cooling portion cools the at least one area adjacent to the impingement portion in the lower section of the cylinder bore with a lower cooling capacity than a cooling capacity of the first cooling portion.

3. The direct-fuel-injection spark-ignition internal combustion engine according to claim 2, wherein:

the cooler includes coolant passages; and the coolant passage corresponding to the second cooling portion is smaller in cross-section than the coolant passage corresponding to the first cooling portion.

4. A direct-fuel-injection spark-ignition internal combustion engine according to claim 1, wherein;

the cooler is disposed only in an area adjacent to the upper section of the cylinder bore and which cools the cylinder bore.

5. The direct-fuel-injection spark-ignition internal combustion engine according to claim 4, further comprising:

a heat insulator located at least in an area adjacent to the impingement portion in the lower section of the cylinder bore.

6. The direct-fuel-injection spark-ignition internal combustion engine according to claim 4, further comprising:

a heater located at least in an area adjacent to the impingement portion in the lower section of the cylinder bore.

7. The direct-fuel-injection spark-ignition internal combustion engine according to claim 6, wherein:

the heater includes an exhaust passage.

8. The direct-fuel-injection spark-ignition internal combustion engine according to claim 7, wherein the exhaust passage is a branch exhaust passage which branches off from a main exhaust passage, further comprising:

a control valve disposed in the branch exhaust passage and which reduces an amount of exhaust gas flowing through the branch exhaust passage by reducing an opening degree of the control valve during the stratified charge combustion in comparison with an opening degree of the control valve during the homogeneous combustion.

9. A direct-fuel-injection spark-ignition internal combustion engine according to claim 1, wherein:

the cooler includes a coolant passage which has first and second passages and which cools the cylinder bore, wherein the first passage is located at least in an area adjacent to the impingement portion in the lower section of the cylinder bore and wherein the second passage is independent of the first passage and is located at least in an area adjacent to an upper section of the cylinder bore; and a control valve disposed in the first passage and which reduces an amount of coolant flowing through the first passage by reducing an opening degree of the control valve during the homogeneous combustion in comparison with an opening degree of the control valve during the stratified charge combustion.

10. A direct-fuel-injection spark-ignition internal combustion engine according to claim 1, wherein:

the cylinder bore has a first side and a second side opposite from the first side;

the fuel injection valve is located at the first side and directly injects fuel into the second side of the cylinder bore which contains the impingement portion;

the cooler includes a coolant passage which has first and second passages and which cools the cylinder bore, wherein the first passage is located in an area adjacent to the second side of the cylinder bore and wherein the second passage is independent of the first passage and is located in an area adjacent to the first side of the cylinder bore; and a control valve disposed in the first passage and which reduces an amount of coolant flowing through the first passage by reducing an opening degree of the control valve during the homogeneous combustion in comparison with an opening degree of the control valve during the stratified charge combustion.

11. A direct-fuel-injection spark-ignition internal combustion engine according to claim 1, wherein:

the internal combustion engine includes a plurality of the cylinder bores having a first side and a second side opposite from the first side, each cylinder bore has a fuel injection valve located at the first side and which directly injects fuel into the second side of its respective cylinder bore;

the cooler includes a coolant passage which has first and second passages and which cools the plurality of cylinder bores, wherein the first passage extends in an area adjacent to the second side of the cylinder bores and wherein the second passage extends in an area adjacent to the first side of the cylinder bores;

a coolant inlet portion provided at a first end of the second passage;

a coolant outlet portion provided at a first end of the first passage;

a communication passage which extends between two of the cylinder bores and through which the first passage communicates with the second passage, wherein a second end of the first passage communicates with a second end of the second passage; and a control valve disposed in the communication passage and which reduces an amount of coolant flowing through the communication passage by reducing an opening degree of the control valve during the homogeneous combustion in comparison with an opening degree of the control valve during the stratified charge combustion.

12. The direct-fuel-injection spark-ignition internal combustion engine according to claim 11, wherein:

the fuel injection valves direct the fuel toward a lower section of the cylinder bores so that the fuel can be injected into a cavity formed in a top face of a piston from an upper section of the cylinder bores during the latter half of the compression stroke;

the first and second passages extend between the lower sections of the cylinder bores; and the coolant passage further comprises:

a third passage which extends in an area adjacent to the second side in the upper sections of the cylinder bores;

a fourth passage which extends in an area adjacent to the first side in the upper sections of the cylinder bores;

a coolant inlet portion provided at a first end of one of the third and fourth passages;

a coolant outlet portion provided at a first end of the other of the third and fourth passages; and a communication passage which extends between the cylinder bores and through which the third passage communicates with the fourth passage.

13. A method of controlling a direct-fuel-injection spark-ignition internal combustion engine which switches its combustion mode in accordance with an operating state of the engine between stratified charge combustion in which fuel is injected during a latter half of a compression stroke and homogeneous combustion in which fuel is injected during an intake stroke and which has a fuel injection valve located in an upper section of a cylinder bore and which directs fuel toward an impingement portion of the cylinder bore located opposed to the fuel injection valve in a lower section of the cylinder bore, comprising:

cooling the cylinder bore so as to suppress a fall in temperature of at least one area adjacent to the impingement portion in the lower section of the cylinder bore in comparison with a fall in temperature in the other area than the at least one area adjacent to the impingement portion, the other area including an area above the impingement portion on a same side of the cylinder bore as the impingement portion.

14. A method of controlling a direct-fuel-injection spark-ignition internal combustion engine according to claim 13, wherein:

the cooling step includes suppressing a fall in temperature of the cylinder bore at least in an area adjacent to the impingement portion in the lower section of the cylinder bore in comparison with a fall in temperature in an area adjacent to the upper section of the cylinder bore.

15. The method according to claim 14, wherein:

the suppressing step includes cooling the impingement portion with a cooling capacity lower than a cooling capacity used for cooling the area adjacent to the upper section of the cylinder bore.

16. The method according to claim 14, wherein:

the suppressing step includes not cooling the impingement portion.

17. The method according to claim 14, wherein:

the suppressing step includes insulating against heat loss from the impingement portion.

18. The method according to claim 14, wherein:

the suppressing step includes heating the impingement area.

19. The method according to claim 14, wherein a first coolant passage is provided adjacent to the upper section of the cylinder bore, and a second coolant passage is provided adjacent to the impingement portion, and wherein:

the suppressing step includes reducing an amount of coolant to flow through the second coolant passage which is independent of the first coolant passage, in comparison with an amount of coolant to flow through the first coolant passage.

20. A method of controlling a direct-fuel-injection spark-ignition internal combustion engine according to claim 13, wherein:

the cooling step includes suppressing a fall in temperature of the cylinder bore in an area adjacent to a first side of the cylinder bore located opposed to the fuel injection valve in comparison with a fall in temperature in an area adjacent to a second side of the cylinder bore which contains the fuel injection valve.

21. The method according to claim 20, wherein:

the internal combustion engine includes a coolant passage which has a first passage extending in an area adjacent to the first side of the cylinder bore and a second passage extending in an area adjacent to the second side of the cylinder bore, a coolant inlet portion which is provided at a first end of the second passage, a coolant outlet portion which is provided at a first end of the first passage, and a communication passage which extends between two of the cylinder bores and through which the first passage communicates with the second passage, a second end of the first passage communicating with a second end of the second passage; and the suppressing step includes reducing an amount of coolant flowing through the communication passage during the homogeneous combustion in comparison with an amount of coolant flowing through the communication passage during the stratified charge combustion.

* * * * *